United States Patent
Hayashi

(10) Patent No.: US 7,352,294 B2
(45) Date of Patent: Apr. 1, 2008

(54) ABSOLUTE POSITION DETECTOR

(75) Inventor: Yasukazu Hayashi, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 11/560,421

(22) Filed: Nov. 16, 2006

(65) Prior Publication Data

US 2007/0120713 A1     May 31, 2007

(30) Foreign Application Priority Data

Nov. 28, 2005   (JP)   ............... 2005-342913

(51) Int. Cl.
*H03M 1/22*   (2006.01)
(52) U.S. Cl. ....................................... 341/15
(58) Field of Classification Search .................. 341/6, 341/7, 11, 15; 250/231.14, 231.16, 231.18
See application file for complete search history.

(56) References Cited

U.S. PATENT DOCUMENTS 3,531,800 A * 9/1970 Baratto et al. ................. 341/6
5,440,501 A * 8/1995 Shimomura et al. .......... 702/150
5,981,941 A * 11/1999 Takata et al. ............. 250/231.16

FOREIGN PATENT DOCUMENTS

JP      4136715      5/1992

* cited by examiner

*Primary Examiner*—Brian Young
(74) *Attorney, Agent, or Firm*—Gauthier & Connors

(57) ABSTRACT

An absolute position detector for accurately reading a code recorded on an absolute track is provided. Output signals from sensors that read a code recorded on an absolute track are input into a binarization processor. A compensator provided within the binarization processor functions to correct and determine the value of a read target bit based on an output signal from a read sensor which is the sensor located closest to the center of the one-bit width of the read target bit, and an output signal from a compensation sensor, which is a sensor separated from the read sensor by a distance within the range from $\lambda/2$ to $3\cdot\lambda/2$.

6 Claims, 8 Drawing Sheets

ABSOLUTE POSITION DETECTOR

CROSS-REFERENCE TO RELATED APPLICATIONS

This application claims priority to Japanese Patent Application No. 2005-342913 filed on Nov. 28, 2005, which is incorporated herein by reference in its entirety.

BACKGROUND OF THE INVENTION

1. Field of the Invention

The present invention relates to an absolute position detector for detecting an absolute position of a component of a device that undergoes a relative displacement by linear or rotational movement, and particularly to signal processing of a sensor output signal used in such a detector.

2. Description of the Related Art

In recent years, direct drive motor systems which incorporate built-in motors and which enable accurate, high speed work have come to be used in rotary tables for machine tooling. In general, because direct drive motor systems enable the detection of magnetic position of a motor and do not require any adjustment of the origin after start-up, such systems are used to implement absolute position detectors capable of detecting absolute positions.

A conventional example of an absolute position detector is a rotary absolute position detector that uses magnetic properties, as shown in FIG. 12. FIG. 13 is a block diagram explaining the operations by which a microcomputer shown in FIG. 12 performs signal processing using software. FIG. 14 is a block diagram explaining the operations of a binarization processor shown in FIG. 13. FIG. 15 is a graph showing the rotational position characteristic of signal SA4 obtained by correcting signal S4 by an offset amount. Further, FIG. 16 is a graph showing the rotational position characteristic of signal C2 obtained after a selector selects signal SA4 or signal SA5.

In FIG. 12, an absolute code disk 2 is composed of a soft magnetic material, and is fixed to a rotational shaft 1. On the outer periphery of the absolute code disk 2, 180 bits of absolute code are recorded such that each 1/180 of the circumference corresponds to 1 bit, with each concave portion denoting "0" and each convex portion denoting "1". The 180-bit code is characterized in that a consecutive 8-bit code pattern differs in every reading position. Accordingly, when the code is read for eight consecutive bits, the rotational position of the rotational shaft 1 can be detected in an absolute manner. Further, an incremental code disk (not shown) is fixed to the rotational shaft 1 on the rear side of the absolute code disk 2. The incremental code disk is shaped similar to a gear wheel which repeats the pattern of concave and convex portions at a pitch of 1/180 rotation, and is composed of a soft magnetic material. On a fixed member provided adjacent to the outer periphery of the absolute code disk 2, a magnetic sensor group 3 including 24 magnetic sensors is arranged in a straight line, with the individual sensors being spaced apart from one another by a distance equivalent to approximately 1/360 rotation of the absolute code disk 2. Further, two magnetic sensors 7, 8 are mounted on a fixed member and positioned adjacent to the outer periphery of the incremental code disk spaced apart from one another by a distance equivalent to approximately 1/720 of the circumference of the incremental code disk.

Both the magnetic sensor group 3 and the magnetic sensors 7, 8 use a permanent magnet or an electromagnet to generate a direct-current or alternating-current magnetic field toward the code disk side, and then convert the magnetic flux, which varies in accordance with changes in magnetic resistance generated by the concave and convex portions on the outer peripheries of the code disks composed of magnetic materials, into electric signals by means of components such as magnetic resistor elements and coils. When sensor output signals from the 24 sensors of the magnetic sensor group 3 are numbered as signals s0, s1, s2, s3, s4, s5, s6, s7, s8, s9, s10, s11, s12, s13, s14, s15, s16, s17, s18, s19, s20, s21, s22, and s23, in that order from the rightmost sensor, a selector 4 configured with an analog switch for receiving 24 inputs and providing a single output switches the sensor signal sequentially from s0 to s23 at uniform time intervals in accordance with selection signal SEL supplied from a microcomputer 13, and outputs the selected sensor signal to an amplifier 5. The amplifier 5 amplifies the sensor signal and outputs the amplified signal to an AD converter 6. The AD converter 6 sequentially converts the amplified sensor output signals s0-s23 into digital signals S0, S1, S2, S3, S4, S5, S6, S7, S8, S9, S10, S11, S12, S13, S14, S15, S16, S17, S18, S19, S20, S21, S22, and S23, and outputs the digital signals to the microcomputer 13. Further, output signals AS, AC from the magnetic sensors 7, 8 are amplified by amplifiers 9, 10 and subsequently converted into digital signals DS, DC by AD converters 11, 12, respectively. The digitized signals DS, DC from the magnetic sensors 7, 8 are output to the microcomputer 13. According to the arrangement of FIG. 12, the signals DS, DC are output as numerical values proportional to the sine value and the cosine value, respectively, of the rotational position, where a rotation of 1/180 of the rotational shaft 1 corresponds to one cycle.

The signals DS and DC obtained by digitizing the output signals from the magnetic sensors 7, 8 are input into an interpolation processor 16 and subjected to bivariate arctangent calculation. As a result, an 8-bit numerical value PL denoting the absolute position of the rotational shaft 1 within 1/180th of a rotation is output from the interpolation processor 16. Further, the signals S0, S1, S2, S3, S4, S5, S6, S7, S8, S9, S10, S11, S12, S13, S14, S15, S16, S17, S18, S19, S20, S21, S22, and S23 obtained by digitizing the output signals from the magnetic sensor group 3 are input into a binarization processor 14. In the binarization processor 14, offset amounts $O_n$, $O_{n+1}$ stored in advance in memory devices 21, 22 are subtracted by subtractors 27, 28 from signals $S_n$ and $S_{n+1}$ output from two adjacent sensors (n is an even number that satisfies $0 \leq n \leq 22$), respectively, so as to output signals $SA_n$ and $SA_{n+1}$. The selector 31 selects the numerical value of either one of signals $SA_n$ and $SA_{n+1}$ depending on whether the most significant bit (MSB) of the 8-bit numerical value PL is 1 or 0, and outputs the selected signal to a comparator 32. The comparator 32 judges whether the selected signal is greater or smaller than 0, and outputs the judged result as binarized numerical value Bm (where m=n/2).

The most significant bit (MSB) of the numerical value PL denotes whether the rotational shaft 1 is positioned in an even- or odd-numbered region when one rotation of the rotational shaft 1 is divided into 360 regions. Using this information, the selector 31 in the binarization processor 14 selects, from among two sensor signals $SA_n$ and $SA_{n+1}$ within the range equivalent to 1 bit (1/180 rotation) of the absolute code disk 2, the sensor signal obtained from a sensor located further away from a bit border at which the bit changes. In this manner, it is possible to binarize a specific bit of the absolute code while avoiding use of a signal from a bit border at which read errors are likely to occur. As described above, the binarization processor 14 can read out, from among the 24 output signals from the magnetic sensor group 3, a consecutive 12-bit numerical value recorded on the absolute code disk 2 as code B. The 12-bit code B identified by the binarization processor 14 is decoded by a decoder 15 to determine the rotational position corresponding to the 8-bit code from B2 to B9 located in the middle portion of the code B, and 8-bit numerical value PH denoting the rotational position of the rotational shaft 1 within one rotation is output. An adder 17 synthesizes a 16-bit numerical value by using the 8-bit numerical value PL denoting the absolute position of the rotational shaft 1 within ¹⁄₁₈₀ rotation as the lower-order bits and the 8-bit numerical value PH as the higher-order bits, and outputs the synthesized result as numerical value PO. In this manner, the absolute rotational position of the rotational shaft 1 within one rotation can be expressed by the 16-bit numerical value PO.

With a conventional absolute encoder such as that shown in FIG. 12, because the rotor can be manufactured using a magnetic material such as iron or an iron alloy, rotors having various outer diameters and provided with apertures having various inner diameters can be relatively easily manufactured by metal processing. Further, because the absolute position can be detected by the plurality of linearly-arranged magnetic sensors irrespective of curvature of the rotor circumference, identical sensor units can be used to detect absolute positions of rotors having various outer diameters. Accordingly, by employing the configuration shown in FIG. 12, it is possible to design absolute encoders of various sizes of outer diameters and aperture diameters without expending significant development costs, such that the conventional absolute encoder has come to be considered suitable for applications such as rotary tables of machine tools in which various sizes of outer diameters and aperture diameters are required for different models. Furthermore, as it is only necessary to provide one type of sensor unit (in which malfunctions tend to be more frequent than in rotors composed substantially of metal lumps), maintenance costs can be minimized.

However, in the absolute encoder using magnetism shown in FIG. 14, because the magnetic sensors are arranged in a straight line, the gap with respect to the absolute code disk 2 becomes larger for the magnetic sensors located further toward the two ends of the sensor group due to the curvature of the absolute code disk 2. Accordingly, signal changes caused by the concave and convex portions of the absolute code disk 2 become smaller for the magnetic sensors located further toward the two ends, resulting in degraded code reading accuracy. For this reason, in order to determine the absolute position, the decoder 15 uses the 8-bit code binarized from 16 sensor signals obtained from the middle portion at which the code read accuracy is relatively high. Nevertheless, as shown at segment e in the graph of FIG. 15 and segment f in the graph of FIG. 16, it can be understood that, even when the sensor signals from the middle portion are used, code reading errors (or "code read errors") are likely to occur in a sensor signal supplying the numerical value B2 which corresponds to the bit at an end of the 8-bit code. Reading errors of this type are common in magnetic sensors due to poor rectilinearity of magnetic flux. Because of the poor rectilinearity of magnetic flux, magnetic sensors tend to be influenced not only by the state of concave and convex portions on the outer periphery of the code disk but also by the code disk shapes in the surroundings. Accordingly, read errors are conventionally prevented by finely adjusting the offset amount for the sensor corresponding to the bit in which a read error occurred.

According to the above-described method, the offset amounts must be adjusted for every different type of code disk, which would be troublesome. Further, it is disadvantageous in that, even when no read errors occur immediately after adjustment, it is not uncommon for read errors to be generated as a result of slight changes in sensor characteristics caused by temperature changes, changes over time, or the like. It should be noted that such a disadvantage is not limited to magnetic sensors but similarly exists in sensors using light which demonstrates good rectilinearity, in that signal interference between optical sensors tend to occur more frequently when the bit pitches of the code recorded on the absolute track are narrower.

SUMMARY OF THE INVENTION

An advantage of an absolute position detector according to the present invention is that a code recorded on an absolute track can be read more accurately.

An absolute position detector according to a first aspect of the present invention comprises a plurality of sensors for reading bit values recorded on an absolute track. An output signal from a read sensor is compensated by an output signal from a compensation sensor. The compensation sensor is a sensor, among the plurality of sensors, that is located apart from the read sensor by a distance within a range from $\lambda/2$ to $3 \cdot \lambda/2$. When reading a read target bit, the read sensor may receive influences from the adjacent bits, such that the output signal from the read sensor may become offset from the signal waveform indicating the bit information. In a bit value determination circuit provided in the absolute position detector, the output signal from the read sensor is corrected based on an output signal from the compensation sensor. In other words, the read sensor output signal is corrected into a signal waveform closely similar to that indicating the bit information. With this arrangement, the absolute position detector can prevent bit read errors to thereby perform reading of the codes more accurately.

An absolute position detector according to a second aspect of the present invention comprises a plurality of sensors for reading bit values recorded on an absolute track, and improves a read sensor output signal based on a sum of the output signals from the plurality of sensors. When reading a read target bit, a read sensor may receive influences from the adjacent bits, such that an output signal from the read sensor may become offset from the signal waveform indicating the bit information. In a bit value determination circuit provided in the absolute position detector, the output signal from the read sensor is improved based on a sum of the output signals from the plurality of sensors. In other words, the read sensor output signal is improved into a signal waveform closely similar to that indicating the bit information. With this arrangement, the absolute position detector can prevent bit read errors and thereby enhance the accuracy of code reading.

An absolute position detector according to a third aspect of the present invention comprises a plurality of sensors for reading bit values recorded on an absolute track, and an incremental sensor for reading bit values recorded on an incremental track. In this absolute position detector, a virtual sensor output signal is estimated based on output signals from two selected sensors. The two selected sensor output signals are signals obtained from positions closest to the center of the one-bit width of a read target bit. When the center of the one-bit width of the read target bit is located between two adjacent sensors, and either of the two sensors reads the read target bit, the output signal from the sensor may become offset from the signal waveform indicating the bit information. In a bit value determination circuit provided in the absolute position detector, two sensors located closest to the center of the one-bit width of the read target bit are selected based on an output signal from the incremental sensor, and a virtual sensor output signal is estimated using the two selected sensors. In other words, a signal waveform closely similar to that indicating the bit information is estimated using the two selected sensors. With this arrangement, the absolute position detector can prevent bit read errors to thereby perform reading of the codes more accurately.

DESCRIPTION OF THE PREFERRED EMBODIMENTS

Figure 1:
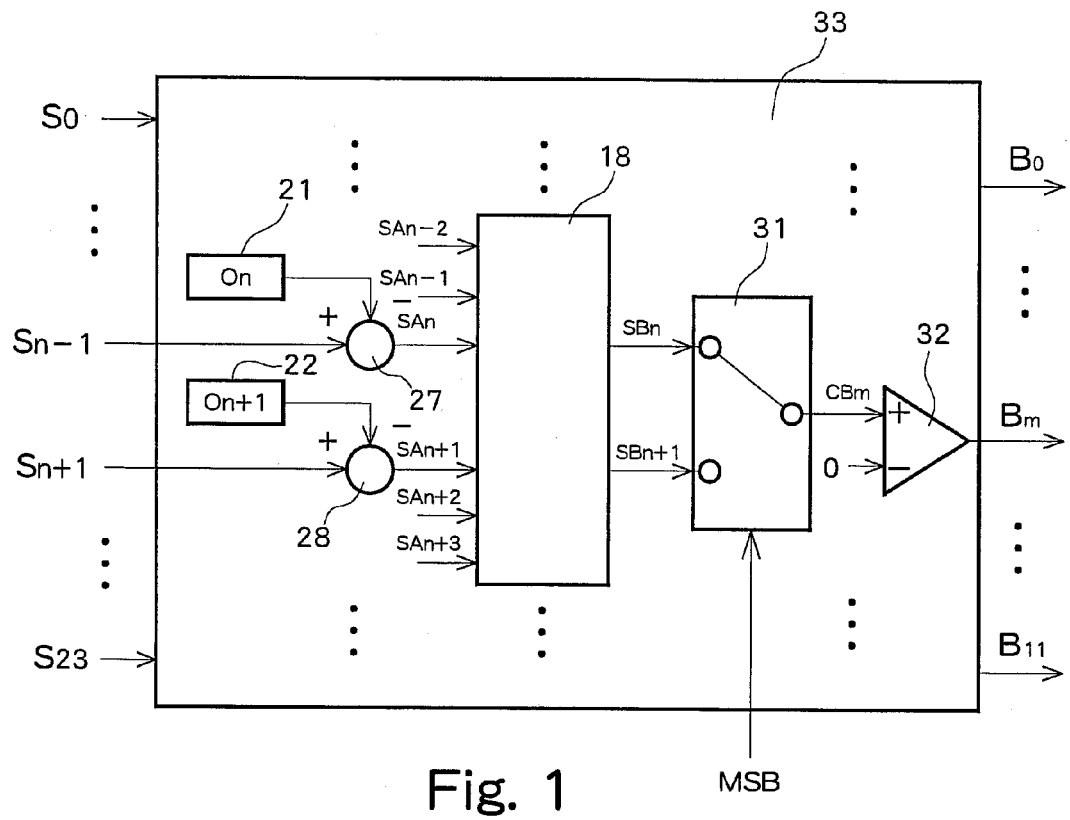
FIG. 1 is a block diagram showing the operations of a binarization processor 33 in an absolute position detector according to the present invention.

The embodiments of the present invention are described below referring to the drawings.

Figure 2:
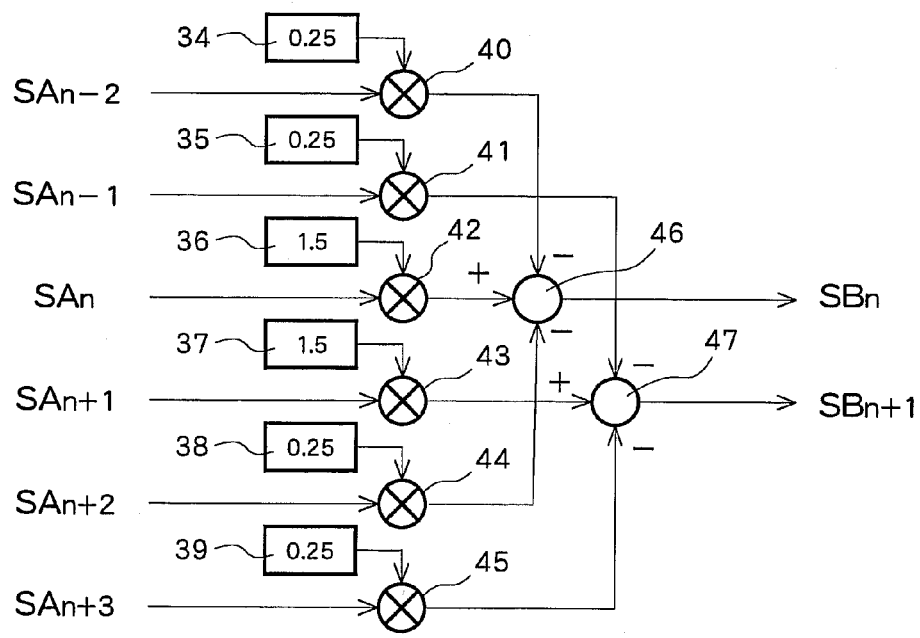
FIG. 2 is a block diagram showing the operations of a compensator 18.
Figure 12:
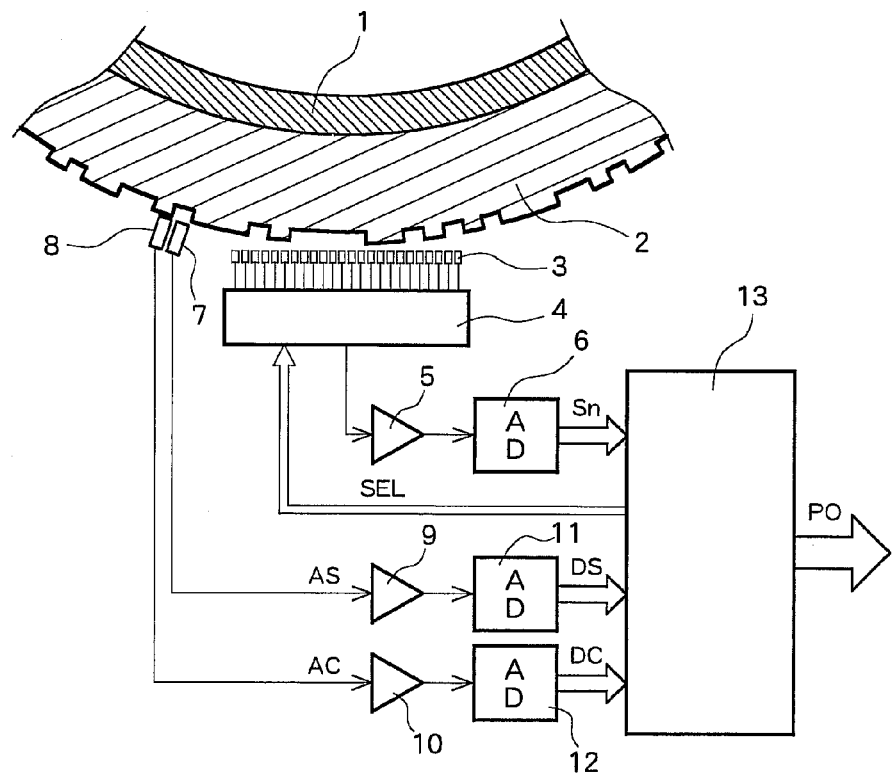
FIG. 12 is a diagram showing a conventional absolute encoder and a position detector thereof.
Figure 14:
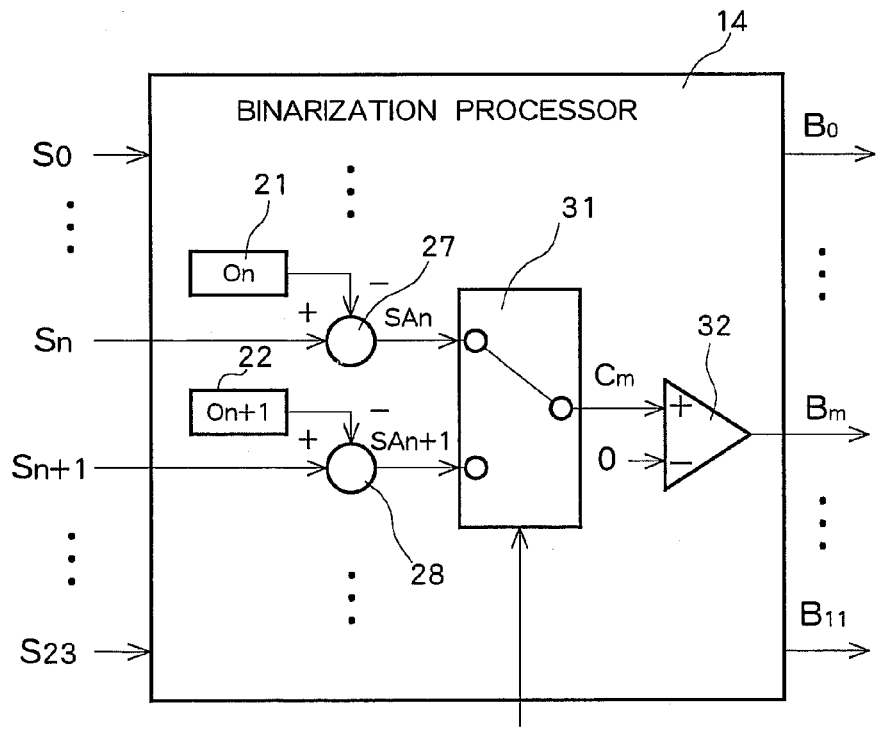
FIG. 14 is a block diagram explaining the operations of a binarization processor 14 in a conventional absolute position detector.

The overall configuration of an absolute position detector according to the present invention is basically similar to that of the conventional device shown in FIG. 12. The characteristic features of the embodiments relate to the configurations, of the binarization processor. In place of the conventional binarization processor 14, a binarization processor 33 shown in FIG. 1 is employed in the first embodiment. FIG. 1 is a block diagram showing the configuration of the binarization processor 33 according to the present embodiment. In FIG. 1, components which have functions identical to those in the binarization processor 14 shown in FIG. 14 are labeled with the same reference numerals, and explanations of those components will not be repeated below. FIG. 2 is a block diagram showing the operations of a compensator 18.

In FIG. 1, sensor signals $SA_{n-2}$, $SA_{n-1}$, $SA_n$, $SA_{n+1}$, $SA_{n-2}$, and $SA_{n+3}$ which are obtained by eliminating offsets in subtractors 27, 28 are input into the compensator 18. In the compensator 18, as shown in FIG. 2, calculation of equation (1) is performed using values stored in memory devices 34, 36, 38, multipliers 40, 42, 44, and subtractor 46, while calculation of equation (2) is performed using values stored in memory devices 35, 37, 39, multipliers 41, 43, 45, and subtractor 47.

$$SB_n = 1.5 \times SA_n - 0.5 \times SA_{n-2} - 0.25 \times SA_{n+2} \quad (1)$$

$$SB_{n+1} = 1.5 \times SA_{n+1} - 0.5 \times SA_{n-1} - 0.25 \times SA_{n+3} \quad (2)$$

The selector 31 selects the numerical value of one of signals $SB_n$ and $SB_{n+1}$, depending on whether the most significant bit (MSB) of the 8-bit numerical value PL is 1 or 0, and outputs the selected signal to the comparator 32. The comparator 32 judges whether the selected signal is greater or smaller than 0, and outputs the judged result as either of 0 or 1.

Figure 3:
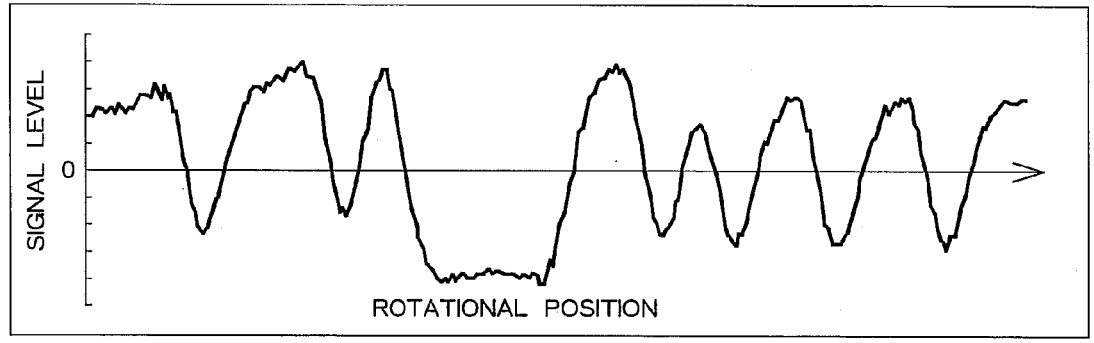
FIG. 3 is a diagram showing the rotational position characteristic of signal SB4 in the binarization processor 33.
Figure 4:
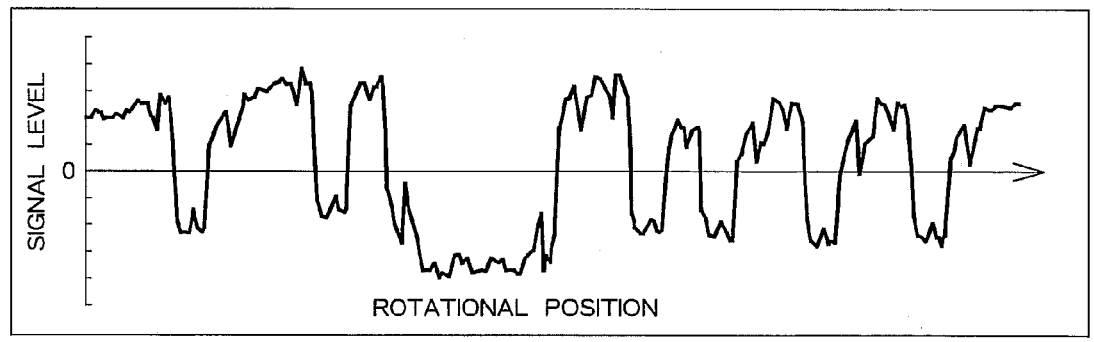
FIG. 4 is a diagram showing the rotational position characteristic of signal CB2 in the binarization processor 33.
Figure 15:
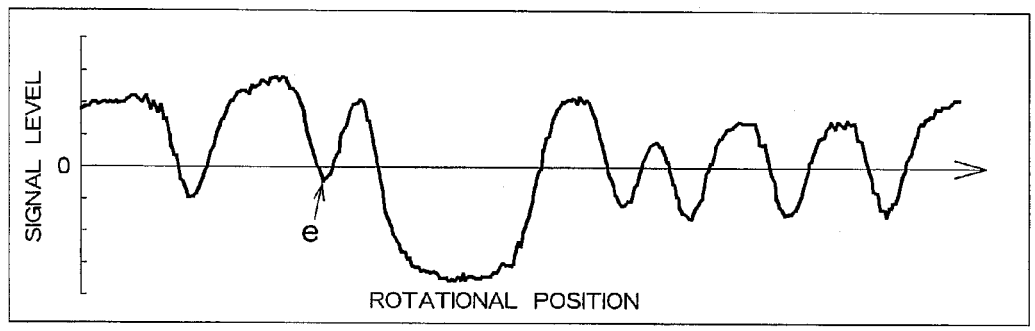
FIG. 15 is a diagram showing the rotational position characteristic of sensor signal SA4 obtained after conventional offset elimination.

The graph of FIG. 3 shows the rotational position characteristic of signal SB4 obtained by correcting signal SA4 using the compensator 18. Further, the graph of FIG. 4 shows the rotational position characteristic of signal CB2 output from the selector 31 after selecting either one of SB4 or SB5. As can be understood from these graphs, by employing the compensator 18, the signal characteristics are greatly improved as compared to in the graphs of FIGS. 15 and 16. A sensor output signal for an absolute encoder obtained using the configuration shown in FIG. 14 has the property of being largely influenced not only by the sensor signal changes in the read target bit but also by the signals of the sensors located adjacent to the read target bit on both sides. Typically, when the value of the read target bit differs from the value of an adjacent bit, the sensor output value corresponding to the read target bit tends to become shifted toward the value of the adjacent bit. In other words, the level of sensor signal $S_n$ of the absolute encoder of FIG. 12 becomes shifted toward the levels of signals $SA_{n-2}$ and $SA_{n+2}$ which are the output signals corresponding to the two positions adjacent to the read target bit. Because of this property it is possible to effectively compensate for shift generated due to the influences by the bits adjacent to the read target bit, by multiplying constant coefficients to signals $SA_{n-2}$ and $SA_{n+2}$ and subtracting the obtained results from the value of $SA_n$. This compensation is most effective when, wherein λ denotes the pitch by which one bit is recorded on the absolute track, the output value of the read sensor (which is the sensor located closest to the center of the one-bit width of the read target bit and the output signal of which is to be corrected) is corrected using an output value of a sensor for compensation which is located apart from the read sensor by a distance equal to λ. However, even when distance by which the compensation sensor is separated is not equal to λ, a certain corrective effect can be expected as long the distance separating compensation sensor from the read sensor is within the range from $\lambda/2$ to $3\cdot\lambda/2$. Assuming that Sp denotes the output signal from the read sensor while Sq and Sr denote the output signals from the compensation sensors located apart from the read sensor by $\lambda$ on both sides, respectively, the signal correction calculations of equations (1) and (2) can be expressed as equation (3) below.

$$(a\cdot Sp)-(b\cdot Sq)-(c\cdot Sr) \quad (3)$$

In equation (3), relationship $a>(b+c)$ always holds true because signal Sp corresponding to the read target bit must be made larger than the other signals. Further, when the sensors are spaced apart from one another by a distance no greater than $3\cdot\lambda/2$, the size of the gap with respect to the rotor is substantially identical for all sensors, such that the signal characteristics are relatively uniform. Accordingly, b=c can hold true as shown in equations (1) and (2). However, it may be possible to accomplish further accurate correction by taking into account the differences in sensor characteristics resulting from the differences in gaps between the respective sensors and the rotor, and setting coefficients a, b, and c in proportion to the gap sizes.

As described above, the binarization processor 33 functions to determine the value of the read target bit based on the output signal from the read sensor which is the sensor located closest to the center of the one-bit width of the read target bit, and the output signals from the compensation sensors which are the sensors located apart from the read sensor by a distance within the range from $\lambda/2$ to $3\cdot\lambda/2$.

Figure 5:
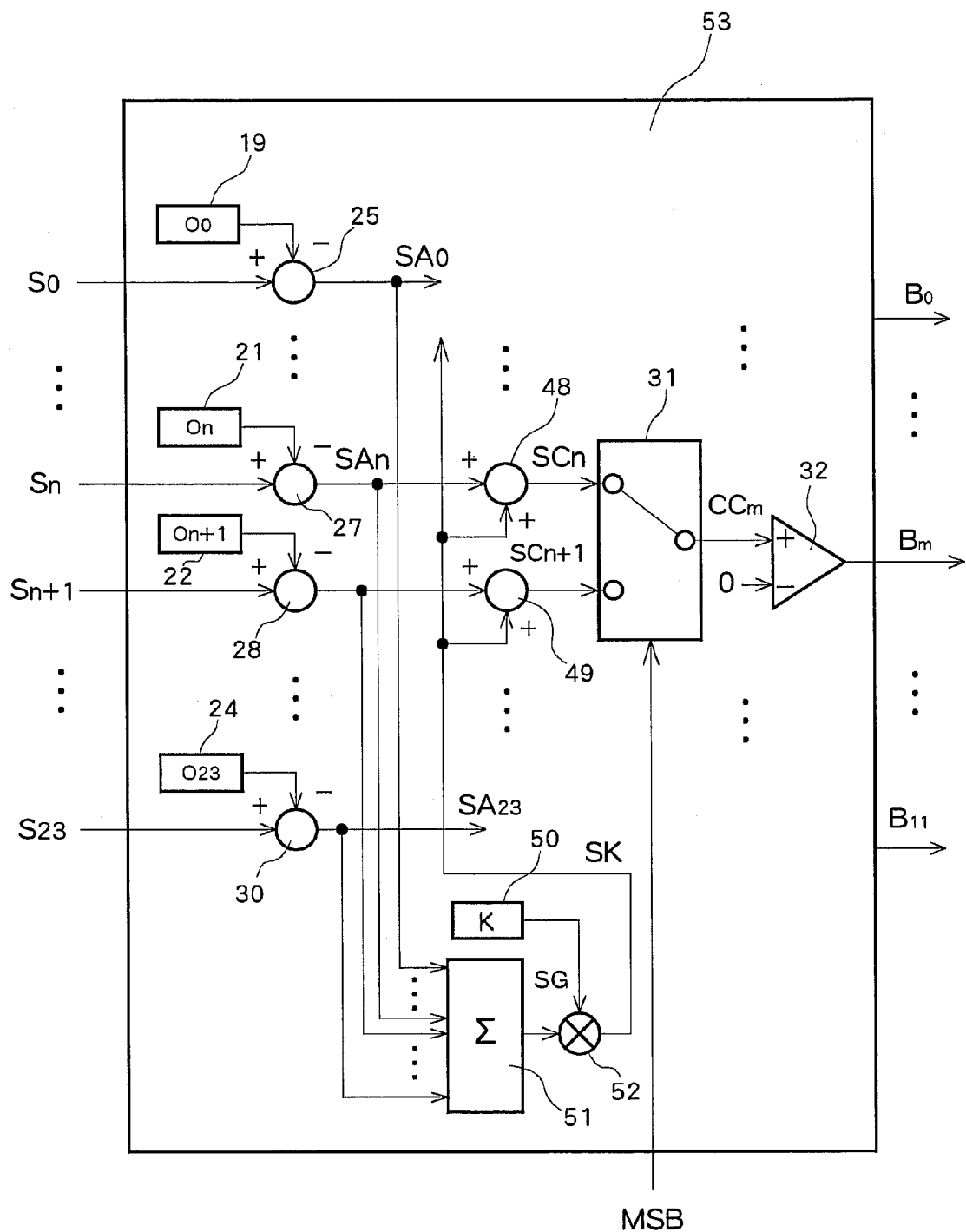
FIG. 5 is a block diagram showing the operations of a binarization processor 53 in an absolute position detector according to the present invention.
Figure 13:
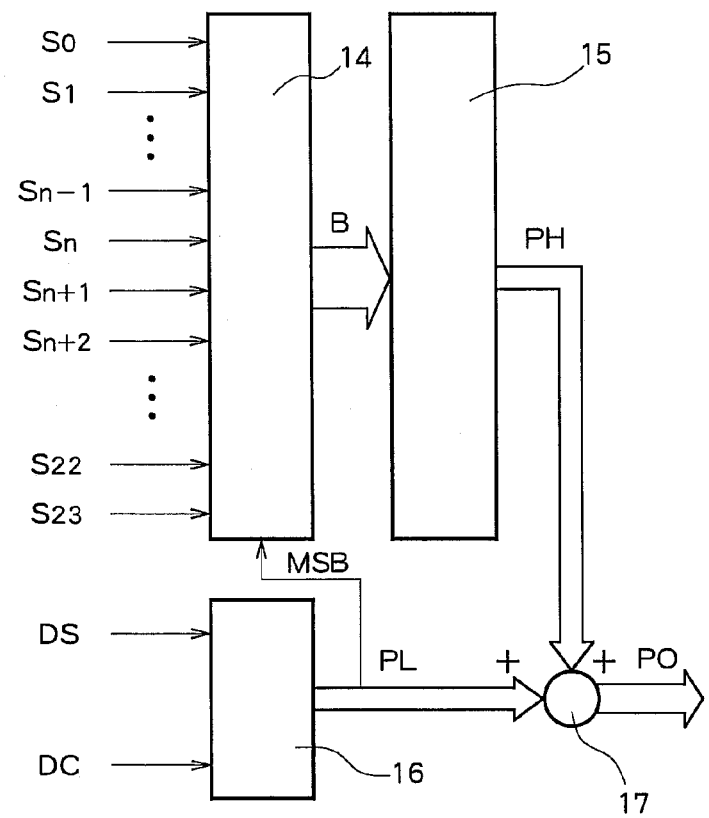
FIG. 13 is a block diagram explaining the conventional software processing operations performed by a microcomputer 13.

FIG. 5 is a block diagram explaining another embodiment of the present invention configured by replacing the binarization processor 14 of the absolute position detector described in FIG. 13 with a binarization processor 53 according to the present invention. In FIG. 5, components which have functions identical to those in FIG. 14 are labeled with the same reference numerals, and explanations of those components will not be repeated below.

In FIG. 5, sensor signals $SA_0$, $SA_1$, ... $SA_{23}$ which are obtained by eliminating offsets in subtractors 25, 26, ... 30 are input into an adder 51, and the adder 51 outputs signal SG which is the sum of these signals. A multiplier 52 multiplies signal SG by coefficient K stored in a memory device 50, and outputs the obtained result as signal SK. In the embodiment of FIG. 5, the processing is performed by using K=1/24, such that signal SK equals the average value of $SA_0$, $SA_1$, ... $SA_{23}$. To each of sensor signals $SA_n$, $SA_{n+1}$ obtained after the offset elimination, signal SK is added in adders 48, 49, respectively, and the added results are output as signals $SC_n$, $SC_{n+1}$. The selector 31 selects the numerical value of either one of signals $SC_n$ and $SC_{n+1}$ depending on whether the most significant bit (MSB) of the 8-bit numerical value PL is 1 or 0, and outputs the selected signal to the comparator 32. The comparator 32 judges whether the selected signal is greater or smaller than 0, and outputs the judgment result as either 0 or 1.

Figure 6:
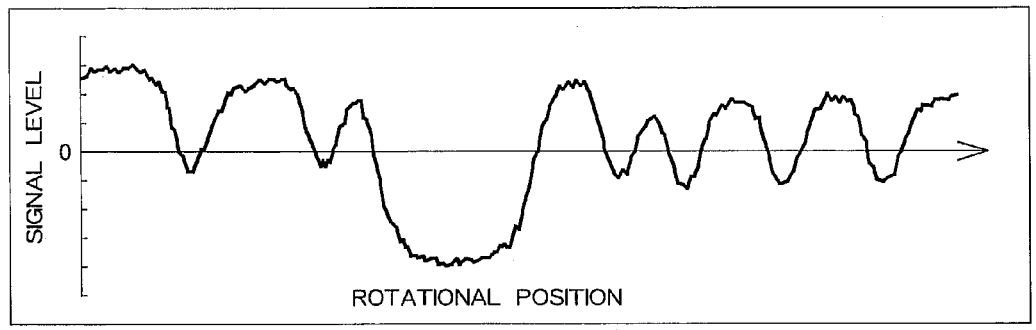
FIG. 6 is a diagram showing the rotational position characteristic of signal SC4 in the binarization processor 53.
Figure 7:
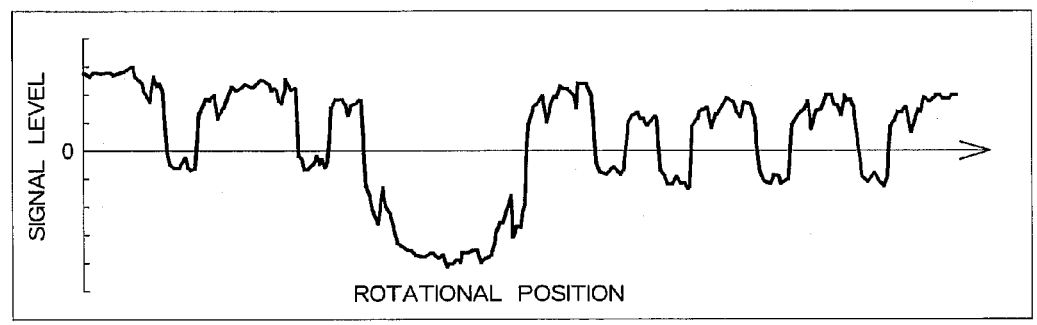
FIG. 7 is a diagram showing the rotational position characteristic of signal CC2 in the binarization processor 53.

The graph of FIG. 6 shows the rotational position characteristic of signal SC4 obtained by adding signal SK to signal SA4. Further, the graph of FIG. 7 shows the rotational position characteristic of signal CC4 obtained after the selector 31 selects signal SC4 or signal SC5. As can be understood from the graphs of FIGS. 6 and 7, by adding a value proportional to the sum of the sensor signals to the individual sensor signals, signal characteristics are improved as compared to in the graphs of FIGS. 15 and 16. In an absolute encoder having a configuration as shown in FIG. 14, there is a tendency that the overall sensor signal output level becomes low when the read-out code includes many "1" and becomes high when the read-out code includes many "0". Accordingly, by adding a numerical value proportional to the sum of the plurality of sensor output signals to the output value of the read sensor, the binarization processor 53 can improve the signal characteristic to more accurately indicate the bit information, as shown in FIGS. 6 and 7.

Figure 8:
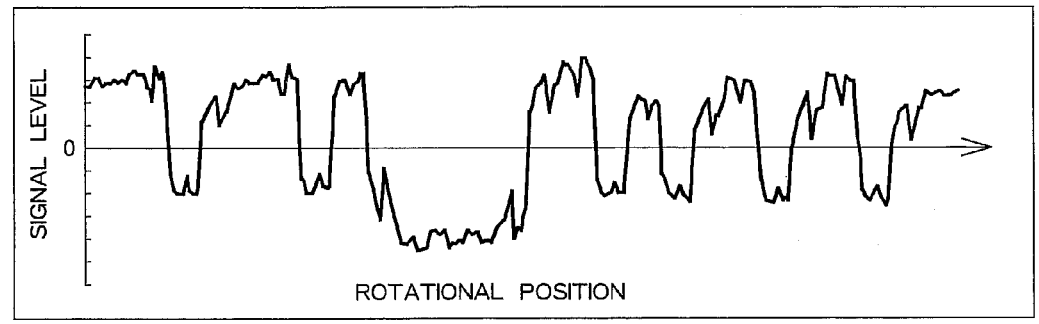
FIG. 8 is a diagram showing the rotational position characteristic of signal CC2 when the compensator 18 is employed in the binarization processor 53.

While the individual sensor signals are corrected using a value proportional to the sum of all sensor outputs obtained after offset elimination in the embodiment of FIG. 5, it should be noted that, in fact, magnetic flux traveling through the sensors located at the two ends of the sensor group is weak due to the influence of the rotor curvature, regardless of the value of the read target bit. Accordingly, instead of the sum of signal outputs from all sensors, it is possible to achieve characteristic improvements by alternatively using, in correcting the individual sensor signals, the sum of signal outputs from at least the sensors located within a region of $N\cdot\lambda$ or greater near the center of the sensor group, where $\lambda$ denotes the pitch by which one bit is recorded on the absolute track and N denotes the minimum number of bits required for identifying an absolute position. Further, the graph of FIG. 8 shows the rotational position characteristic of signal CC2 obtained in a case in which the compensator 18 of FIG. 2 is applied immediately before the selector 31. As can be understood when comparing the graph of FIG. 8 to the graphs of FIGS. 4 and 7, the signal characteristic can be further improved by combining the two types of signal processing as compared to when only either one of the signal processing is used.

As described above, the binarization processor 53 functions to determine the value of the read target bit based on the output signal of the read sensor and the sum of the output signals from the plurality of sensors.

Figure 9:
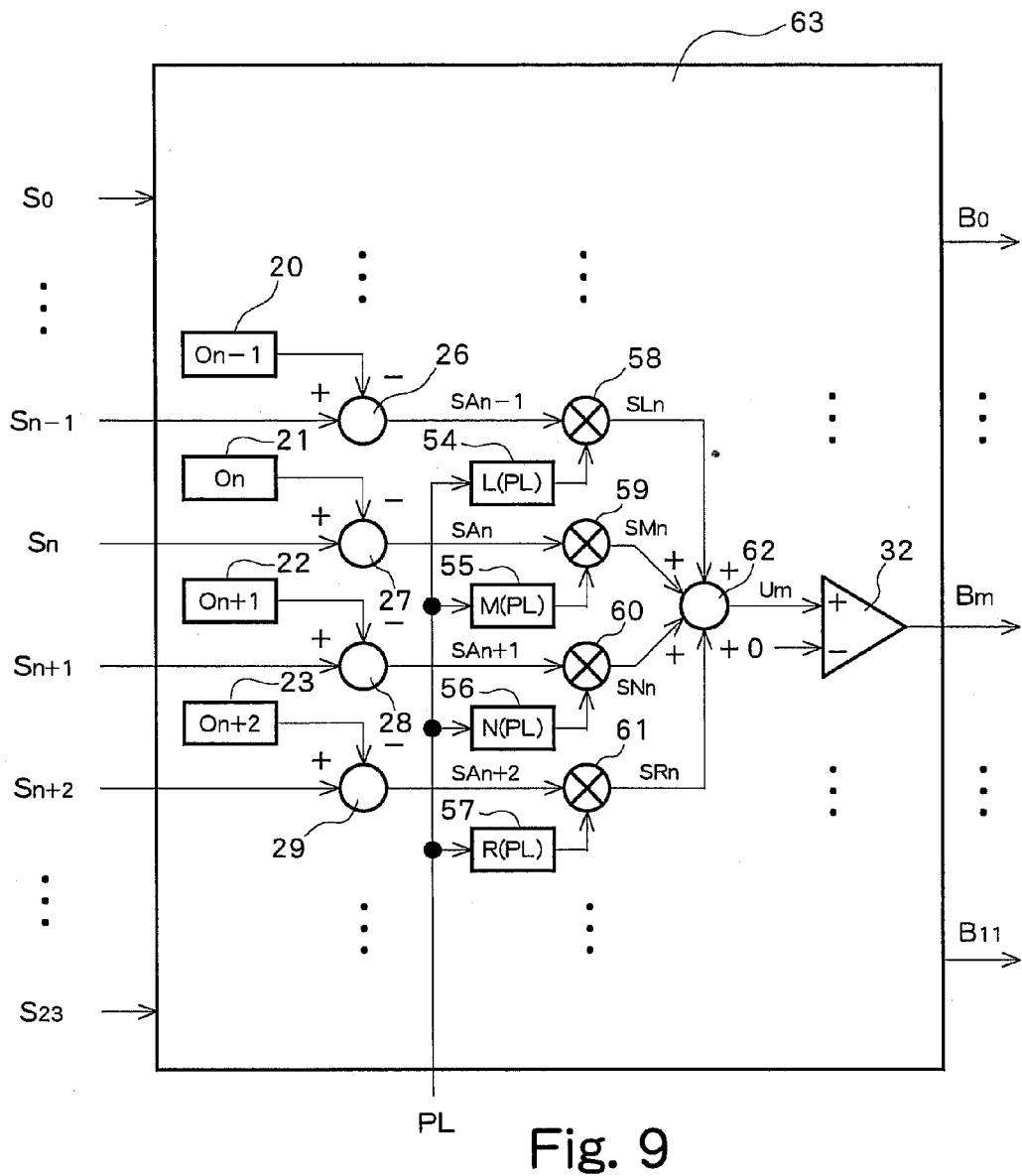
FIG. 9 is a block diagram showing the operations of a binarization processor 63 in an absolute position detector according to the present invention.

FIG. 9 is a block diagram explaining a further embodiment of the present invention configured by replacing the binarization processor 14 of the absolute position detector described in FIG. 13 with a binarization processor 63 according to the present invention. In FIG. 9, components which have functions identical to those in FIG. 14 are labeled with the same reference numerals, and explanations of those components will not be repeated below.

In FIG. 9, sensor signals $SA_{n-1}$, $SA_n$, $SA_{n+1}$, and $SA_{n+2}$ which are obtained by eliminating offsets in subtractors 26, 27, 28, and 29 are multiplied by the values of functions L(PL), M(PL), N(PL), and R(PL) in multipliers 58, 59, 60, and 61, respectively. Functions L(PL), M(PL), N(PL), and R(PL) are calculations expressed by equations (4), (5), (6), and (7) below, respectively, each of which employs, as the input variable, the 8-bit numerical value PL which denotes an absolute position of the rotational shaft 1 within 1/180 rotation. As a result of the multiplications, signals $SL_m$, $SM_m$, $SN_m$, and $SR_m$ are output.

$$L(PL)=0 \text{ when } PL<192; \ L(PL)=(PL-192)/128 \text{ when } PL\geq192 \quad (4)$$

$$M(PL)=0 \text{ when } PL<64; \ M(PL)=(PL-64)/128 \text{ when } 64\leq PL<192; \ M(PL)=(320-PL)/128 \text{ when } PL\geq192 \quad (5)$$

$$N(PL)=(PL+64)/128 \text{ when } PL<64; \ N(PL)=(192-PL)/128 \text{ when } 64\leq PL<192; \ N(PL)=0 \text{ when } PL\geq192 \quad (6)$$

$$R(PL)=(64-PL)/128 \text{ when } PL<64; \ R(PL)=0 \text{ when } PL\geq64 \quad (7)$$

The four values $SL_m$, $SM_m$, $SN_m$, and $SR_m$ obtained after multiplication are added up into a single value in an adder 62, and output as signal $U_m$. The comparator 32 judges whether this signal $U_m$ is smaller or greater than zero, and outputs the judgment result as either 0 or 1.

Figure 10:
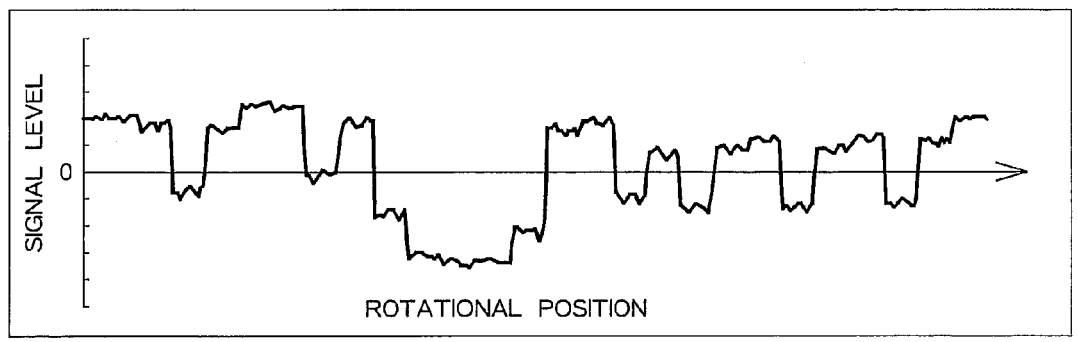
FIG. 10 is a diagram showing the rotational position characteristic of signal U2 in the binarization processor 63.
Figure 11:
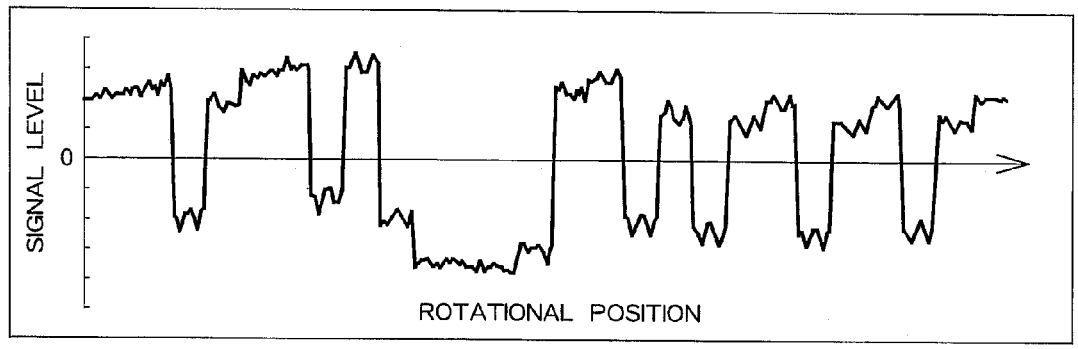
FIG. 11 is a diagram showing the rotational position characteristic of signal U2 when the compensator 18 is employed in the binarization processor 63.
Figure 16:
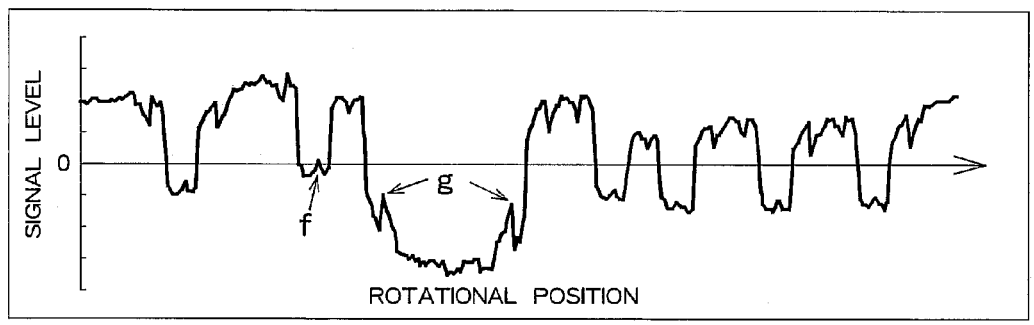
FIG. 16 is a diagram showing the rotational position characteristic of signal C2 output from the conventional binarization processor 14.

The graph of FIG. 10 shows the rotational position characteristic of U2 output from the adder 62. Characteristic degradations such as those appearing as segments g in FIG. 16 are eliminated, and it can be understood that the signal characteristic is improved. According to a method used in the conventional binarization processor 14 in which a signal from the sensor located closest to the center of the one-bit width of the read target bit is selected, when the center of the one-bit width of the read target bit is positioned at a midpoint between two adjacent sensors, selection of either one of the two sensors would result in a relatively large error with respect to the ideal sensor value, causing degradations in signal characteristic as appearing at segments g in FIG. 16. In contrast, in the binarization processor 63 of FIG. 9, by employing the functions given by equations (4), (5), (6), (7) and the multipliers 58, 59, 60, 61 such that two of the four function values for the four segments divided according to the PL value always become 0, signals from two sensors closest to the center of the one-bit width of the read target bit are selected. Further, each of the selected two sensor signals is multiplied by a coefficient that is varied depending on the distance (PL) from the center of the one-bit width of the read target bit, and a sum of the multiplied results is calculated in the adder 62. In this manner, an interpolation calculation is performed using the two sensor signal outputs to obtain a virtual sensor output signal from the center of the one-bit width of the read target bit. It is thereby possible to avoid the disadvantage of the conventional method of selecting either of the two signals, and to determine the value of the read target bit with a high accuracy. Further, the graph of FIG. 11 shows the rotational position characteristic of signal U2 obtained in a case in which signals $SA_{n-1}$, $SA_n$, $SA_{n+1}$, and $SA_{n+2}$ after being passed through the compensator 18 of FIG. 2 are employed as the signals input into the multipliers 58, 59, 60, 61 in the binarization processor 63. As can be understood when comparing the graph of FIG. 11 to the graphs of FIGS. 4 and 10, the signal characteristic can be further improved by combining the two types of signal processing as compared to when only one of signal processing is used.

While the above-described embodiments refer to cases in which the signal processing is performed with respect to signals after being subjected to offset elimination, binarization may be performed by comparing, to an offset value, a signal which is subjected to the signal processing without correcting the offset. Further, while the above description refers to an embodiment in which a virtual sensor signal from the center of the one-bit width of the read target bit is obtained based on signals which have been passed through the compensator, it is possible to first obtain a virtual sensor signal for each read target bit and subsequently correct the virtual sensor signal by means of the compensator. Moreover, the signal processing of the present invention may be performed with respect to sensor signals which have been subjected to signal processing other than that of the present invention.

While the above embodiments are described referring to rotary absolute encoders using magnetism, the present invention is not limited to such configurations and can similarly be implemented using other encoders, such as optical absolute encoders and linear absolute encoders. Further, while the absolute track is provided on a movable member and the sensors are provided on a fixed member in the above examples, it is possible to employ other configurations, such as, for example, a reversed configuration in which the absolute track is provided on a fixed member and the sensors are provided on a movable member.

What is claimed is:

1. An absolute position detector which detects an absolute position of a moving movable member positioned opposing a fixed member, wherein:
   one of the fixed member and the movable member comprises an absolute track having a pattern of numerical sequence composed of binary numbers recorded at a bit pitch of $\lambda$, the pattern forming different codes of consecutive N bits depending on read positions;
   the other of the fixed member and the movable member comprises a plurality of sensors positioned opposing the absolute track for reading values of at least N consecutive bits; and
   the absolute position detector comprises a bit value determination circuit that determines a bit value of a read target bit based on an output signal from a read sensor located closest to center of a one-bit width of the read target bit, and an output signal from a compensation sensor which is a sensor, among the plurality of sensors, which is located apart from the read sensor by a distance within a range from $\lambda/2$ to $3 \cdot \lambda/2$.

2. The absolute position detector as defined in claim 1, wherein
   the bit value determination circuit determines the bit value of the read target bit based on the output signal from the read sensor located closest to the center of the one-bit width of the read target bit, and output signals from compensation sensors which are spaced apart from the read sensor on both sides by a distance of $\lambda$; and
   when Sp denotes the output signal from the read sensor and Sq and Sr denote the output signals from the compensation sensors, the read target bit value is determined based on a calculation of $(a \cdot Sp) - (b - Sq) - (c - Sr)$, where $a > (b+c)$.

3. An absolute position detector which detects an absolute position of a moving movable member positioned opposing a fixed member, wherein:
   one of the fixed member and the movable member comprises an absolute track having a pattern of numerical sequence composed of binary numbers recorded at a bit pitch of $\lambda$, the pattern forming different codes of consecutive N bits depending on read positions;
   the other of the fixed member and the movable member comprises a plurality of sensors positioned opposing the absolute track for reading values of at least N consecutive bits; and
   the absolute position detector comprises a bit value determination circuit that determines a bit value of a read target bit based on an output signal from a read sensor located closest to center of a one-bit width of the read target bit, and a sum of output signals from the plurality of sensors.

4. The absolute position detector as defined in claim 3, wherein
   the bit value determination circuit determines the bit value of the read target bit based on the output signal from the read sensor located closest to the center of the one-bit width of the read target bit, and a sum of output signals from the sensors located within a region of $N \cdot \lambda$ or greater; and the read target bit value is determined by adding the output signal from the read sensor and an average value of the output signals from the sensors located within a region of N·λ or greater.

5. An absolute position detector which detects an absolute position of a moving movable member positioned opposing a fixed member, wherein:

one of the fixed member and the movable member comprises an absolute track having a pattern of numerical sequence composed of binary numbers recorded at a bit pitch of λ, the pattern forming different codes of consecutive N bits depending on read positions, the one of the fixed member and the movable member further comprising an incremental track having recorded thereon a pattern which repeats in a cycle of an integer multiple of the bit pitch λ;

the other of the fixed member and the movable member comprises a plurality of sensors positioned opposing the absolute track for reading values of at least N consecutive bits, and an incremental sensor positioned opposing the incremental track for reading an absolute position within the bit pitch λ;

the absolute position detector comprises a sensor selector for selecting, based on information on the absolute position within the bit pitch λ obtained from an output signal of the incremental sensor, two sensor signals acquired from positions closest to center of a one-bit width of a read target bit; and the absolute position detector further comprises a bit value determination circuit that determines a bit value of the read target bit by estimating, based on the two selected sensor signals, a virtual sensor output signal from the center of the one-bit width of the read target bit.

6. The absolute position detector as defined in claim 5, wherein the bit value determination circuit determines the bit value of the read target bit based on the two selected sensor signals and the information on the absolute position within the bit pitch λ obtained from the incremental sensor; and the read target bit value is determined based on an interpolation calculation in which the two selected sensor signals are multiplied by a coefficient that is varied depending on the absolute position information, and a sum of the multiplied results is calculated.

* * * * *